Dec. 5, 1944.  H. J. KERTH  2,364,537
NURSING BOTTLE HOLDER
Filed May 31, 1943
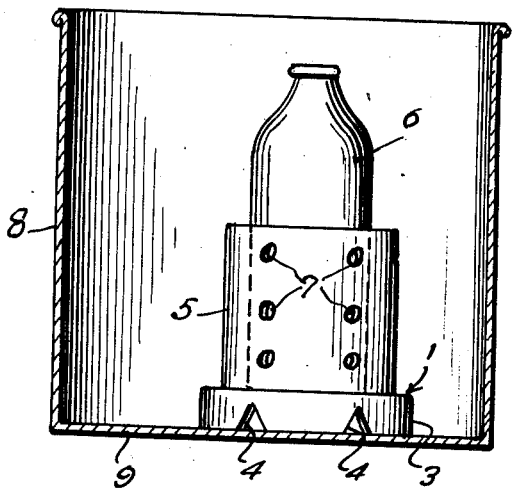
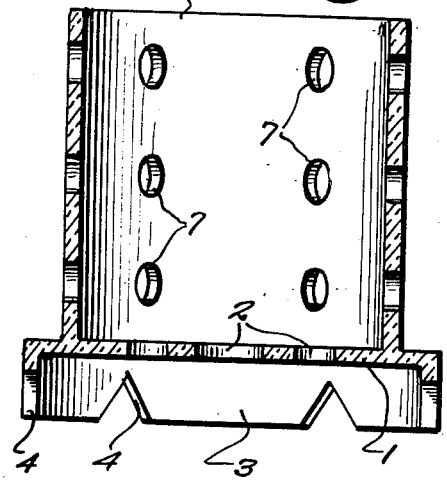
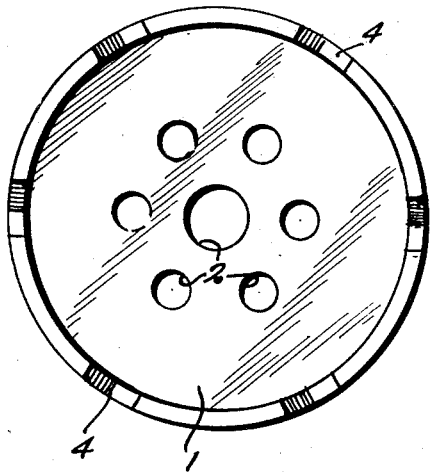
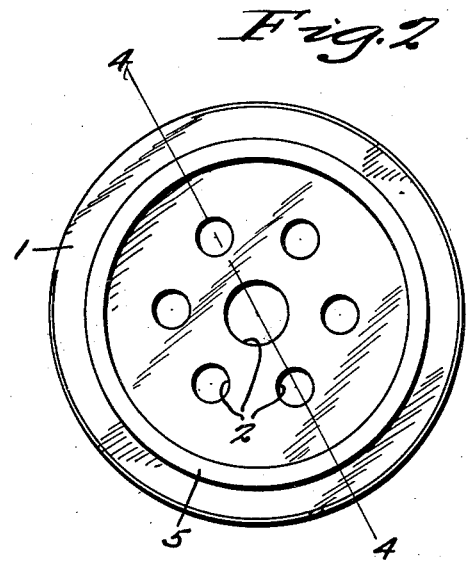
Inventor
Hillard J. Kerth
By Clarence A. O'Brien
and Harvey B. Jacobson
Attorneys Patented Dec. 5, 1944

2,364,537

UNITED STATES PATENT OFFICE 2,364,537

NURSING BOTTLE HOLDER

Hillard J. Kerth, New Orleans, La.

Application May 31, 1943, Serial No. 489,197

1 Claim. (Cl. 99—359)

The present invention relates to new and useful improvements in nursing bottle holders and has for its primary object to provide, in a manner as hereinafter set forth, novel means for supporting bottles of this character out of contact with the excessively hot bottoms of receptacles in which they are placed in the usual manner for warming the milk therein.

Another very important object of the invention is to provide a holder of the aforementioned character which will positively prevent the bottle from tipping over when the water in the receptacle boils.

Other objects of the invention are to provide a nursing bottle holder of the character described which will be comparatively simple in construction, durable, highly efficient and reliable in use, compact, and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a view in vertical section through a receptacle, showing a nursing bottle holder constructed in accordance with the present invention mounted therein.

Figure 2 is a top plan view of the device.

Figure 3 is a bottom plan view.

Figure 4 is a vertical sectional view, taken substantially on the line 4—4 of Figure 2.

Referring now to the drawing in detail, it will be seen that the embodiment of the invention which has been illustrated comprises a circular elevated base 1 of suitable material and diameter. The base 1 has formed therein water circulating openings 2.

The base 1 has formed integrally with its periphery a depending supporting skirt or flange 3. The supporing skirt 3 of the base 1 has formed therein at circumferentially spaced points substantially V-shaped notches or recesses 4 for the passage of water, said notches or recesses extending upwardly into said skirt from the lower edge thereof.

Rising from the base 1 is an integral cylindrical wall 5 for the reception of a nursing bottle 6. The wall 5 is of a smaller diameter than the base 1. The wall 5 has formed therein a multiplicity of water circulating openings 7.

It is thought that the manner in which the device is used will be readily apparent from a consideration of the foregoing. Briefly, the holder is placed in a conventional receptacle 8 of water in a manner to rest on the bottom 9 of said receptacle. The construction of the holder is such that the nursing bottle 6 is firmly supported in an upright position in spaced relation above the receptacle bottom 9. However, the passages 2, 4, and 7 permit the water to circulate freely around the bottle for accelerating the warming of the milk therein. If desired, the wall 5 may be provided with a suitable handle or bail to facilitate handling the device.

It is believed that the many advantages of a nursing bottle holder constructed in accordance with the present invention will be readily understood, and although a preferred embodiment of the device is as illustrated and described, it is to be understood that changes in the details of construction may be resorted to which will fall within the scope of the invention as claimed.

What is claimed is:

As a new article of manufacture, a unitary device for holding a nursing bottle in a vertical position within and spaced above the bottom of a conventional open-top water-containing cooking vessel for heating the contents of the bottle, comprising a flat circular base having a cylindrical flange integral with and depending from the peripheral edge thereof and provided with a centrally located cylindrical wall of greater diameter than the bottle, said cylindrical wall being integral with and rising from the base, said flange having a plurality of uniformly spaced relatively large notches in its lower edge and said base and said cylindrical wall having a plurality of relatively large openings therethrough, for the circulation of the water.

HILLARD J. KERTH.